(12) United States Patent
Oshima

(10) Patent No.: US 12,031,498 B2
(45) Date of Patent: Jul. 9, 2024

(54) ENGINE AND SPACER

(71) Applicant: TOYOTA JIDOSHA KABUSHIKI KAISHA, Aichi-ken (JP)

(72) Inventor: Tomoya Oshima, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/459,420

(22) Filed: Sep. 1, 2023

(65) Prior Publication Data

US 2024/0141851 A1 May 2, 2024

(30) Foreign Application Priority Data

Oct. 31, 2022 (JP) .................. 2022-174504

(51) Int. Cl.
*F02F 1/16* (2006.01)
*F02F 1/14* (2006.01)
*F16J 15/08* (2006.01)

(52) U.S. Cl.
CPC ............... *F02F 1/166* (2013.01); *F02F 1/14* (2013.01); *F16J 15/0818* (2013.01)

(58) Field of Classification Search
CPC ........... F02F 1/14; F02F 1/166; F16J 15/0818
See application file for complete search history.

(56) References Cited

U.S. PATENT DOCUMENTS

| | | | | |
|---|---|---|---|---|
| 2009/0266315 A1* | 10/2009 | Hanai | ............ | F02F 1/14 123/41.72 |
| 2010/0242868 A1* | 9/2010 | Shikida | ............ | F02F 1/108 123/41.79 |
| 2017/0268405 A1* | 9/2017 | Yi | ............ | F02F 1/004 |
| 2017/0370271 A1* | 12/2017 | Lee | ............ | F01P 11/04 |
| 2020/0063635 A1* | 2/2020 | Fujita | ............ | F02F 1/14 |

FOREIGN PATENT DOCUMENTS

JP 2007285197 A 11/2007

* cited by examiner

*Primary Examiner* — Kevin A Lathers
(74) *Attorney, Agent, or Firm* — HAUPTMAN HAM, LLP

(57) ABSTRACT

An engine includes a cylinder block including a first jacket through which a coolant flows, a spacer disposed within the first jacket, a cylinder head including a second jacket through which the coolant flows from the first jacket; and a gasket interposed between the cylinder block and the cylinder head. The cylinder block includes a branch passage branched off from the first jacket to supply the coolant to an external device. The gasket includes communication ports that communicate the first jacket with the second jacket. The spacer includes a protruding portion that penetrates one of the communication ports that is closest to the branch passage. There is a clearance between the protruding portion and the one of the communication ports.

5 Claims, 4 Drawing Sheets

ENGINE AND SPACER

CROSS-REFERENCE TO RELATED APPLICATION

This application is based upon and claims the benefit of priority of the prior Japanese Patent Application No. 2022-174504, filed on Oct. 31, 2022, the entire contents of which are incorporated herein by reference.

TECHNICAL FIELD

The present disclosure relates to an engine and a spacer.

BACKGROUND

There is an engine in which a coolant flows from a jacket of a cylinder block to a jacket of a cylinder head via communication ports formed in a gasket (see, for example, Japanese Unexamined Patent Application Publication No. 2007-285197).

The cylinder block may be provided with a branch passage that branches off from the jacket of the cylinder block to supply the coolant to an external device. The flow rate of the coolant passing through the communication port in the vicinity of such a branch passage might be affected by the flow rate of the coolant flowing through the branch passage. Therefore, it is conceivable to finely adjust the flow rate of the coolant passing through the communication port by changing the size and shape of the communication port. However, there is a limitation in manufacturing in changing the size and shape of the communication port.

SUMMARY

It is therefore an object of the present disclosure to provide an engine and a spacer capable of finely adjusting a flow rate of a coolant flowing from a cylinder block to a cylinder head.

The above object is achieved by an engine including: a cylinder block including a first jacket through which a coolant flows; a spacer disposed within the first jacket; a cylinder head including a second jacket through which the coolant flows from the first jacket; and a gasket interposed between the cylinder block and the cylinder head, wherein the cylinder block includes a branch passage branched off from the first jacket to supply the coolant to an external device, the gasket includes communication ports which communicate the first jacket with the second jacket, the spacer includes a protruding portion that penetrates one of the communication ports that is closest to the branch passage, and there is a clearance between the protruding portion and the one of the communication ports.

The cylinder head may include cylinder bores, the communication port penetrated by the protruding portion may include a first edge and a second edge, the first edge may extend along a circumferential direction of the cylinder bore closest to the communication port penetrated by the protruding portion, when viewed in an axial direction of the cylinder bore closest to the communication port penetrated by the protruding portion, the second edge may extend along the circumferential direction when viewed in the axial direction and is located on an outer side of the first edge in a radial direction of the cylinder bore closest to the communication port penetrated by the protruding portion, the clearance may include a first clearance and a second clearance, the first clearance may be a clearance between the protruding portion and the first edge in the radial direction, the second clearance may be a clearance between the protruding portion and the second edge in the radial direction, and the first clearance may be larger than the second clearance.

A length of the protruding portion in the circumferential direction may be greater than a thickness of the protruding portion in the radial direction when viewed from the axial direction.

A length of the communication port penetrated by the protruding portion in the circumferential direction may be greater than a width of the communication port penetrated by the protruding portion in the radial direction when viewed from the axial direction.

Also, the above object is achieved by a spacer including: a main body portion disposed within a first jacket of a cylinder block through which a coolant flows; a protruding portion protruding from the first jacket toward a cylinder head, wherein the cylinder block includes a branch passage branched off from the first jacket to supply the coolant to an external device, the cylinder head includes a second jacket through which the coolant flows from the first jacket via a gasket, the gasket includes communication ports that communicate the first jacket with the second jacket, the protruding portion penetrates one of the communication ports that is closest to the branch passage, and there is a clearance between the protruding portion and the one of the communication ports.

DETAILED DESCRIPTION

Figure 1:
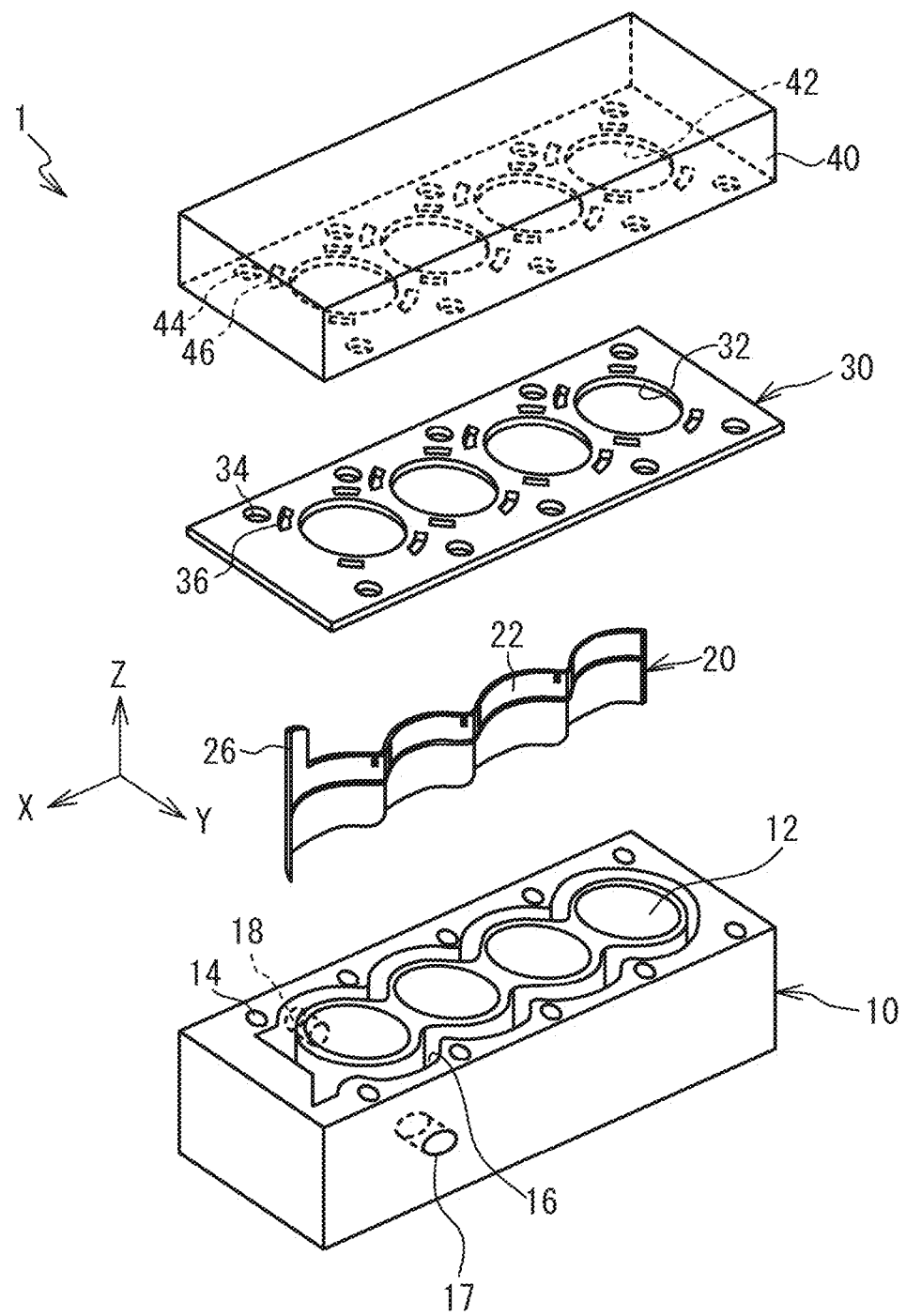
FIG. 1 is an exploded perspective view of an engine.

FIG. 1 is an exploded perspective view of an engine 1. The engine 1 includes a cylinder block 10, a spacer 20, a gasket 30, and a cylinder head 40. The cylinder block 10, the gasket 30, and the cylinder head 40 are stacked in this order from the bottom in a Z direction.

The cylinder block 10 is made of, for example, an aluminum alloy. Cylinder bores 12, bolt holes 14, a first jacket 16, an introduction passage 17, and a branch passage 18 are formed in the cylinder block 10. The four cylinder bores 12 are arranged in an X direction. The first jacket 16 is a groove-shaped flow passage surrounding the four cylinder bores 12. The coolant is introduced into the first jacket 16 from an inlet (not illustrated). The bolt holes 14 are formed around the first jacket 16. The introduction passage 17 merges with the first jacket 16 and is a passage for introducing the coolant from the outside into the first jacket 16. The branch passage 18 branches off from the first jacket 16 and extends in the −Y direction. The branch passage 18 is a passage for supplying the coolant from the first jacket 16 to an external device. The external device is, for example, an oil cooler, but may be a supercharger, an EGR cooler, a heater, or the like.

The spacer 20 is disposed within the first jacket 16 of the cylinder block 10. The spacer 20 is made of, for example, resin. The spacer 20 has a main body portion 22 and a protruding portion 26. The main body portion 22 is curved along one side surface of each of the four cylinder bores 12.

The main body portion 22 is located in the first jacket 16. The protruding portion 26 protrudes from one end of the main body portion 22 in the +Z direction. That is, the protruding portion 26 protrudes from the first jacket 16 toward the cylinder head 40. The protruding portion 26 will be described in detail later. The coolant flows between the spacer 20 and the cylinder bore 12. Thus, the cylinder bore 12 can be efficiently cooled. The shape of the main body portion 22 is not limited to the shape illustrated in FIG. 1. For example, the main body portion 22 may be formed in a U shape so as to surround the four cylinder bores 12 from both side surfaces thereof.

The gasket 30 is interposed between the cylinder head 40 and the cylinder block 10. The gasket 30 is made of metal, for example, and is formed in a thin plate shape. The gasket 30 is provided with openings 32, bolt holes 34, and communication ports 36. The openings 32 are provided at positions corresponding to the cylinder bores 12, respectively. The bolt holes 34 are provided at positions corresponding to the bolt holes 14, respectively. The communication ports 36 are provided at positions corresponding to the first jacket 16 of the cylinder block 10. Specifically, the communication ports 36 are provided at positions overlapping with the first jacket 16 in the −Z direction.

The cylinder head 40 is made of metal such as an aluminum alloy. The cylinder head 40 is attached to the upper side of the cylinder block 10. The cylinder head 40 is provided with openings 42, bolt holes 44, and introduction ports 46. Each of the openings 42 defines an intake port and an exhaust port. The openings 42 are provided at positions corresponding to the openings 32 and the cylinder bores 12, respectively. The bolt holes 44 are provided at positions corresponding to the bolt holes 14 and the bolt holes 34, respectively. The introduction ports 46 are provided at positions corresponding to the communication ports 36, respectively. Therefore, the introduction ports 46 are also provided at positions overlapping the first jacket 16 in the −Z direction. The gasket 30 and the cylinder head 40 are fastened to the cylinder block 10 by the bolts inserted into the bolt holes 14, 34, and 44.

Figure 2:
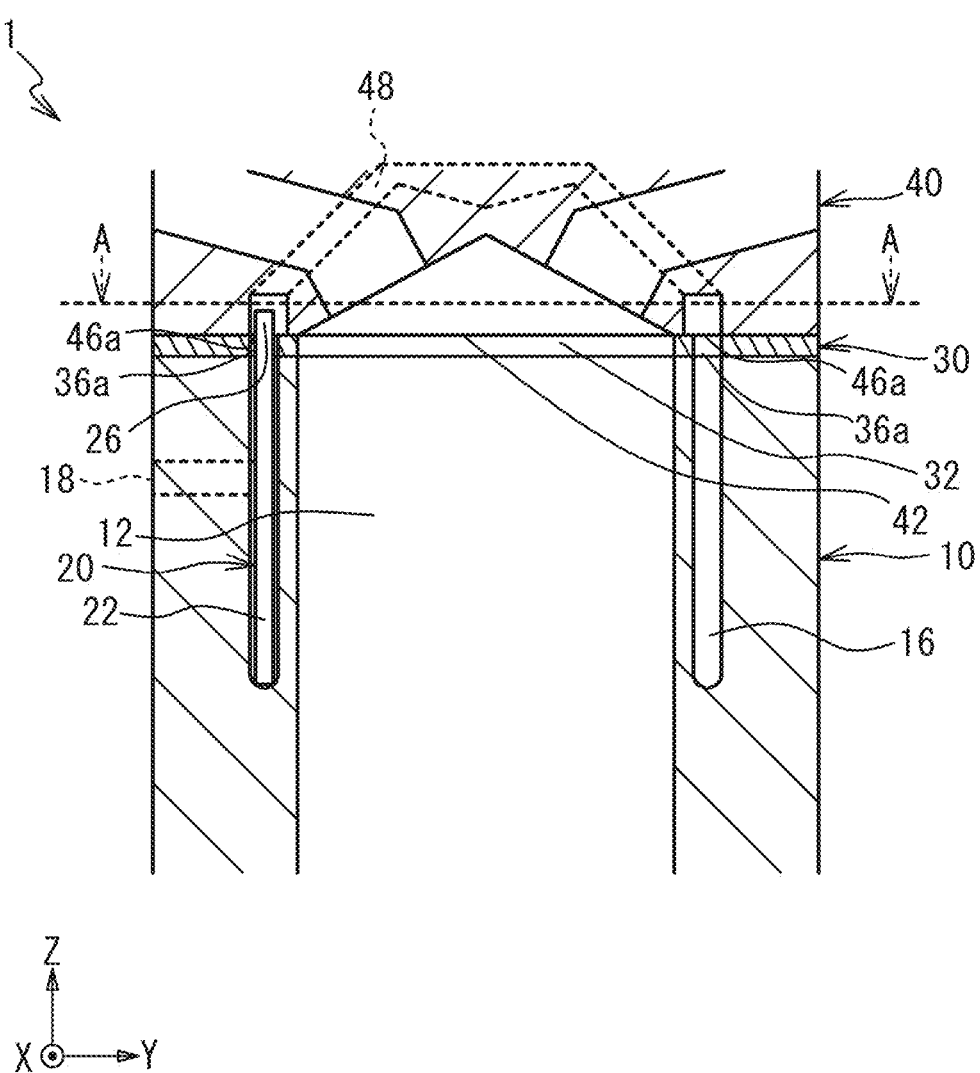
FIG. 2 is a cross-sectional view of the engine.
Figure 3:
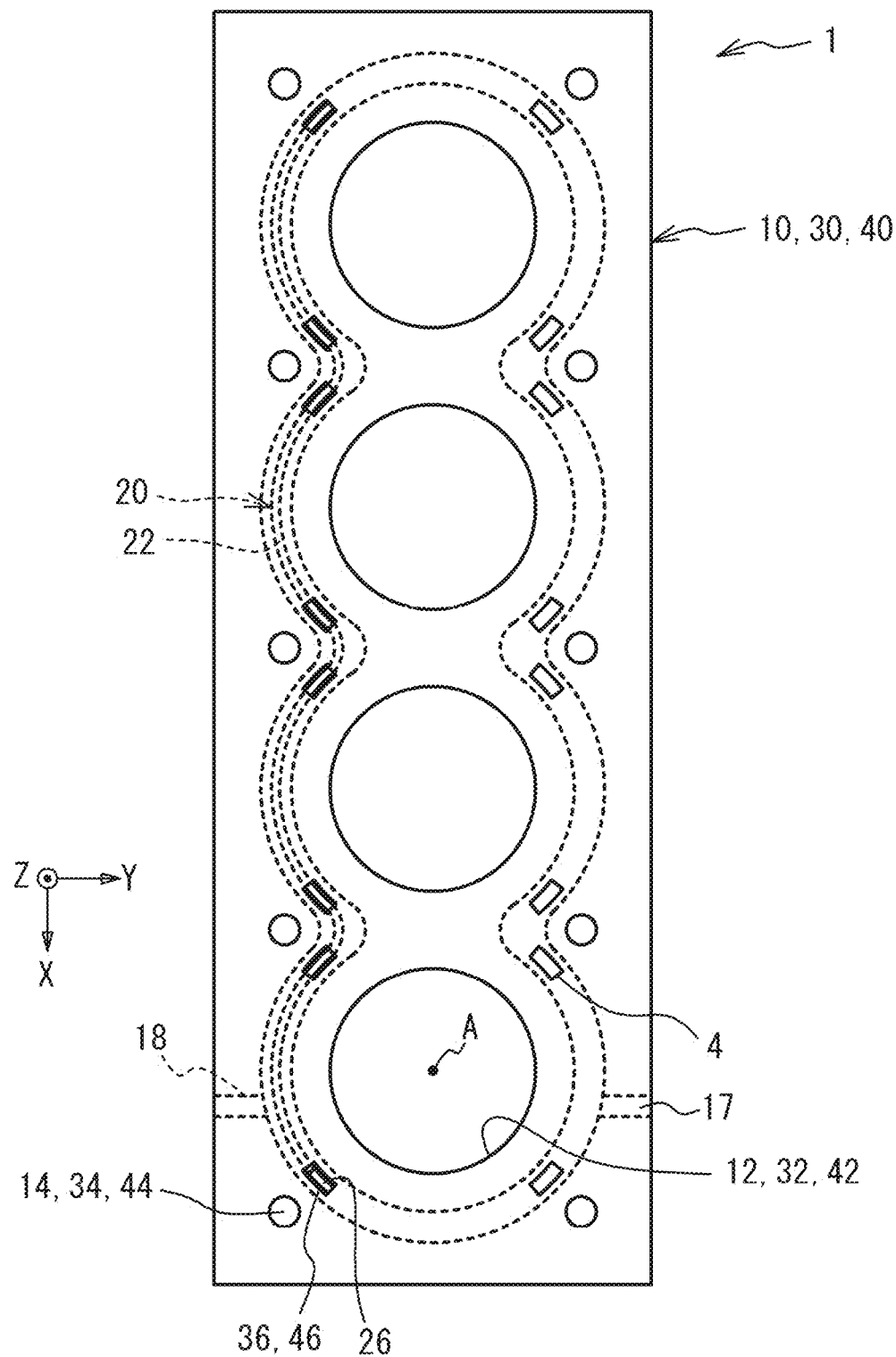
FIG. 3 is a cross-sectional view taken along line A-A in FIG. 2.

FIG. 2 is a cross-sectional view of the engine 1. FIG. 2 illustrates a cross section perpendicular to the X direction. FIG. 3 is a cross-sectional view taken along line A-A in FIG. 2. FIG. 3 illustrates a cross section perpendicular to the Z direction. In other words, FIG. 3 is a view in the direction of the axis A of the cylinder bore 12. The coolant flowing in the first jacket 16 flows to a second jacket 48 of the cylinder head 40 via the communication port 36. Therefore, the communication port 36 allows the first jacket 16 and the second jacket 48 to communicate with each other. The protruding portion 26 of the spacer 20 disposed within the first jacket 16 protrudes in the +Z direction from the first jacket 16 of the cylinder block 10. The protruding portion 26 penetrates one of the communication ports 36 and one of the introduction ports 46. A distal end of the protruding portion 26 is positioned in the second jacket 48 of the cylinder head 40 communicating with the introduction port 46. Hereinafter, the communication port 36 and the introduction port 46 penetrated by the protruding portion 26 are referred to as a communication port 36a and an introduction port 46a, respectively.

Figure 4:
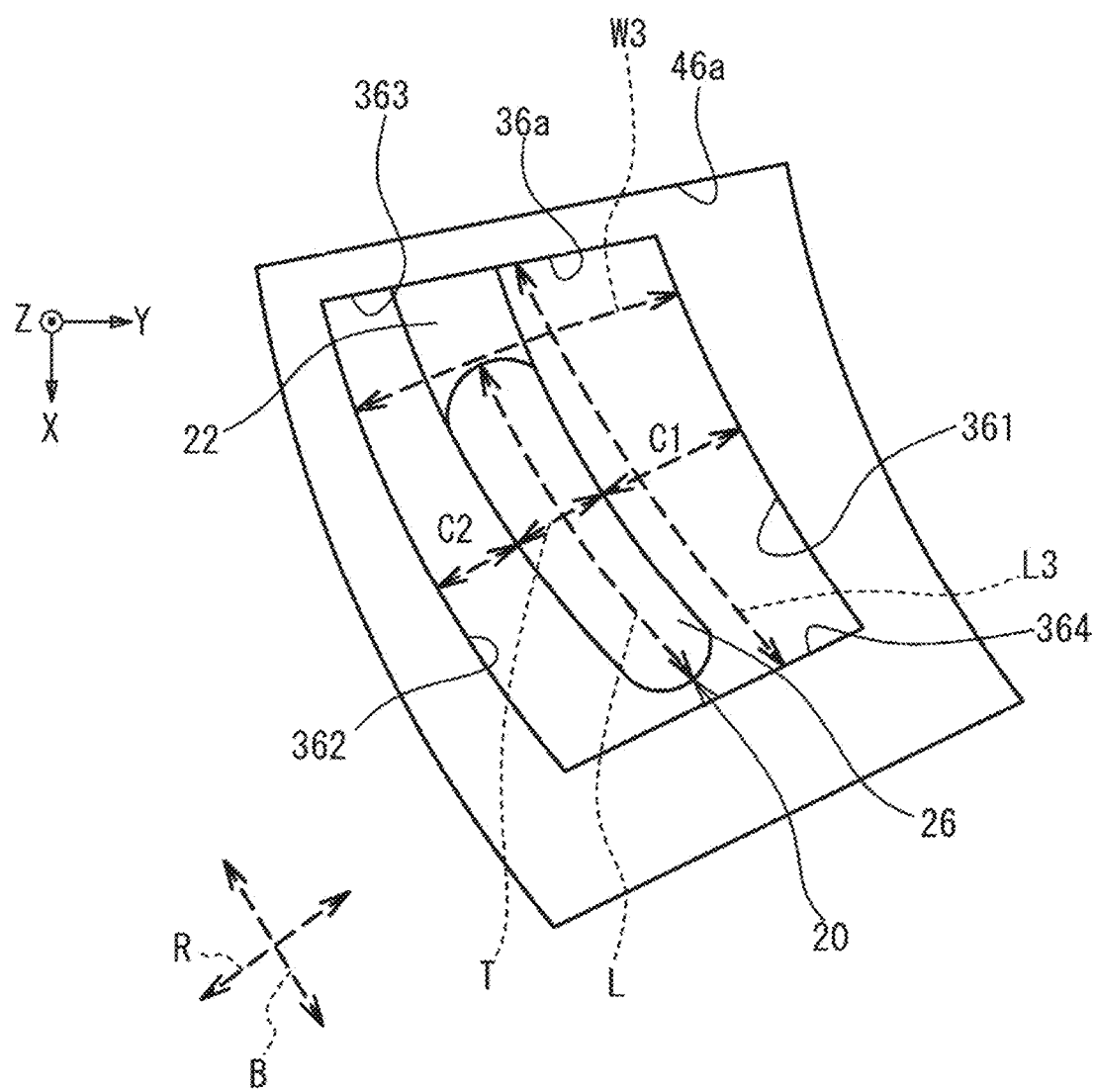
FIG. 4 is an enlarged view illustrating the periphery of a protruding portion.

FIG. 4 is an enlarged view illustrating the periphery of the protruding portion 26. FIG. 4 is a view in the direction of the axis A of the cylinder bore 12, similar to FIG. 3. FIG. 4 illustrates a circumferential direction B and a radial direction R of the cylinder bore 12 closest to the protruding portion 26. Each of the communication port 36a and the introduction port 46a has a substantially rectangular shape, but the shape is not limited thereto. The introduction port 46a is larger than the communication port 36a. The communication port 36a is larger than the protruding portion 26. That is, the protruding portion 26 penetrates the communication port 36a with a clearance therebetween. Herein, the coolant passing through the communication port 36a flows through a region between the protruding portion 26 and the inner edge of the communication port 36a. Therefore, the flow rate of the coolant passing through the communication port 36a is finely adjusted by changing the shape of the protruding portion 26. Here, the communication port 36a is formed by, for example, press working. The size and shape of the opening that is formed by such processing are limited. Therefore, by changing the shape of the protruding portion 26, the flow rate of the coolant passing through the communication port 36a is finely adjusted without being restricted by the manufacturing of the communication port 36a.

The spacer 20 is made of resin and is manufactured by injection molding, for example. Therefore, the shape of the protruding portion 26 can be changed by modifying or changing a mold. Similarly, when the spacer 20 is made of metal, the shape of the protruding portion 26 can be changed by modifying or changing a casting mold.

As illustrated in FIG. 4, the communication port 36a includes a first edge 361 extending along the circumferential direction B, and a second edge 362 extending along the circumferential direction B and located outward of the first edge 361 in the radial direction R. A clearance C1 between the protruding portion 26 of the spacer 20 and the first edge 361 is greater than a clearance C2 between the protruding portion 26 and the second edge 362. Therefore, the flow rate of the coolant flowing between the protruding portion 26 and the first edge 361 is larger than the flow rate of the coolant flowing between the protruding portion 26 and the second edge 362. Thus, the cylinder bore 12 closest to the protruding portion 26 is efficiently cooled.

In the protruding portion 26, a length L in the circumferential direction B is larger than a thickness T in the radial direction R. Therefore, the size of the clearance C1 is secured. Accordingly, an opening area between the protruding portion 26 and the first edge 361 is secured. Therefore, the flow rate of the coolant flowing between the protruding portion 26 and the first edge 361 is secured.

Further, in the communication port 36a, a length L3 in the circumferential direction B is longer than a width W3 in the radial direction R. As described above, also in the protruding portion 26, the length L in the circumferential direction B is larger than the thickness T in the radial direction R. Therefore, the shape between the protruding portion 26 and the first edge 361 and the shape between the protruding portion 26 and the second edge 362 are each substantially elliptical. Here, even in a case where the opening area of the perfectly circular opening and the opening area of the elliptical opening are the same, stagnation is more likely to occur around the perfectly circular opening than around the elliptical opening. Therefore, the occurrence of stagnation is suppressed, and the flow rate of the coolant passing through the communication port 36a is secured.

The introduction port 46a is formed larger than the communication port 36a. Even if there is an error in the installation position of the cylinder head 40 with respect to the gasket 30, it is possible to suppress the shape of the introduction port 46 from affecting the flow rate of the coolant finely adjusted by the protruding portion 26.

As illustrated in FIGS. 1 and 2, the communication port 36a is closer to the branch passage 18 than the other communication ports 36. Here, in the vicinity of the branch passage 18 and the communication port 36a, a part of the coolant flows to the branch passage 18 and the communication port 36a, and the rest of the coolant flows in the first jacket 16. Therefore, the flow rate of the coolant passing through the communication port 36a may be affected by the flow rate of the coolant flowing through the branch passage 18. For example, when the flow rate of the coolant flowing through the branch passage 18 increases, the flow rate of the coolant passing through the communication port 36a may decrease. On the other hand, when the flow rate of the coolant flowing through the branch passage 18 decreases, there is a possibility that the flow rate of the coolant passing through the communication port 36a increases. In this way, the flow rate of the coolant passing through the communication port 36a that may be affected by the branch passage 18 is finely adjusted by adjusting the shape of the protruding portion 26.

The communication port 36a includes a third edge 363 and a fourth edge 364 extending along the radial direction R and opposed to each other in the circumferential direction B. The protruding portion 26 is spaced apart from each of the third edge 363 and the fourth edge 364, but may be in contact therewith.

The clearance C2 may be zero. That is, the protruding portion 26 may be in contact with the second edge 362 of the communication port 36a. As a result, the size of the clearance C1 is secured and the cylinder bore 12 closest to the protruding portion 26 is efficiently cooled.

Although some embodiments of the present disclosure have been described in detail, the present disclosure is not limited to the specific embodiments but may be varied or changed within the scope of the present disclosure as claimed.

What is claimed is:

1. An engine comprising:
   a cylinder block including a first jacket through which a coolant flows;
   a spacer disposed within the first jacket;
   a cylinder head including a second jacket through which the coolant flows from the first jacket; and
   a gasket interposed between the cylinder block and the cylinder head,
   wherein
   the cylinder block includes a branch passage branched off from the first jacket to supply the coolant to an external device,
   the gasket includes communication ports that communicate the first jacket with the second jacket,
   the spacer includes a protruding portion that penetrates one of the communication ports that is closest to the branch passage, and
   there is a clearance between the protruding portion and the one of the communication ports.

2. The engine according to claim 1, wherein
   the cylinder head includes cylinder bores,
   the communication port penetrated by the protruding portion includes a first edge and a second edge,
   the first edge extends along a circumferential direction of the cylinder bore closest to the communication port penetrated by the protruding portion, when viewed in an axial direction of the cylinder bore closest to the communication port penetrated by the protruding portion,
   the second edge extends along the circumferential direction when viewed in the axial direction and is located on an outer side of the first edge in a radial direction of the cylinder bore closest to the communication port penetrated by the protruding portion,
   the clearance includes a first clearance and a second clearance,
   the first clearance is a clearance between the protruding portion and the first edge in the radial direction,
   the second clearance is a clearance between the protruding portion and the second edge in the radial direction, and
   the first clearance is larger than the second clearance.

3. The engine according to claim 2, wherein a length of the protruding portion in the circumferential direction is greater than a thickness of the protruding portion in the radial direction when viewed from the axial direction.

4. The engine according to claim 3, wherein a length of the communication port penetrated by the protruding portion in the circumferential direction is greater than a width of the communication port penetrated by the protruding portion in the radial direction when viewed from the axial direction.

5. A spacer comprising:
   a main body portion disposed within a first jacket of a cylinder block through which a coolant flows; and
   a protruding portion protruding from the first jacket toward a cylinder head,
   wherein
   the cylinder block includes a branch passage branched off from the first jacket to supply the coolant to an external device,
   the cylinder head includes a second jacket through which the coolant flows from the first jacket via a gasket,
   the gasket includes communication ports which communicate the first jacket with the second jacket,
   the protruding portion penetrates one of the communication ports that is closest to the branch passage, and
   there is a clearance between the protruding portion and the one of the communication ports.

* * * * *